(12) United States Patent
Ishizaka et al.

(10) Patent No.: US 7,724,558 B1
(45) Date of Patent: May 25, 2010

(54) MAGNETIC SIGNAL TRANSMISSION LINE

(75) Inventors: Satoshi Ishizaka, Tokyo (JP); Kazuo Nakamura, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/525,183

(22) Filed: Mar. 14, 2000

(30) Foreign Application Priority Data

Mar. 19, 1999 (JP) ............................... 11-076373
Mar. 19, 1999 (JP) ............................... 11-076389

(51) Int. Cl.
*H01L 41/12* (2006.01)
*H01L 43/02* (2006.01)
*H01L 43/12* (2006.01)

(52) U.S. Cl. .................... 365/2; 257/664; 257/E27.005

(58) Field of Classification Search ................. 257/664, 257/E27.005; 365/2
See application file for complete search history.

(56) References Cited

U.S. PATENT DOCUMENTS

| | | | | |
|---|---|---|---|---|
| 3,334,343 A | * | 8/1967 | Snyder | 341/149 |
| 3,369,225 A | * | 2/1968 | Fuller | 365/87 |
| 3,372,345 A | * | 3/1968 | Fuller | 330/63 |
| 3,497,712 A | * | 2/1970 | Jungclas, Jr | 307/421 |
| 3,523,286 A | * | 8/1970 | Bobeck et al. | 365/42 |
| 3,540,021 A | | 11/1970 | Bobeck et al. | |
| 3,573,765 A | * | 4/1971 | Perneski | 365/7 |
| 3,636,531 A | * | 1/1972 | Copeland, III | 365/22 |
| 3,696,347 A | * | 10/1972 | Copeland, III | 365/15 |
| 3,701,129 A | * | 10/1972 | Copeland | 365/19 |
| 3,711,838 A | * | 1/1973 | Kefalas | 365/2 |
| 3,921,155 A | * | 11/1975 | Minnick et al. | 365/18 |
| 4,052,710 A | * | 10/1977 | Calhoun et al. | 365/3 |

OTHER PUBLICATIONS

Wei, M. et al, "Size effects on switching field of isolated and interactive arrays of nanoscale singledomain Ni bars fabricated using electron-beam namolithography", Journal of Appl Phys., 76, Nov. 15, 1994, Part 2, No. 10.

* cited by examiner

*Primary Examiner*—Evan Pert
(74) *Attorney, Agent, or Firm*—Hayes Soloway P.C.

(57) ABSTRACT

A magnetic signal transmission line includes a one-dimensional array of a plurality of single-magnetization domains each formed in a ferromagnetic body. The anisotropic energy of the single-magnetization domains is zero to 120% of the interactive energy acting between dipoles in adjacent single-magnetization domains. The single-magnetization domains are formed by sputtering iron onto a silicon substrate by using a mask.

16 Claims, 3 Drawing Sheets

MAGNETIC SIGNAL TRANSMISSION LINE

BACKGROUND OF THE INVENTION (a) Field of the Invention

The present invention relates to a magnetic signal transmission line and, more particularly, to a magnetic signal transmission line for transmitting a signal through a one-dimensional array of a plurality of single-magnetization domains.

(b) Description of a Related Art

Metallic interconnects, such as copper and aluminum interconnects, or low-resistance polysilicon interconnects are generally used in an electronic circuit for signal transmission. The transmission rate in the signal transmission by using the metallic interconnects or polysilicon interconnects is restricted by a delay constant (CR constant) of the interconnect, the CR constant being defined by the product of the resistance R by the parasitic capacitance C of the interconnect. The CR constant is currently a primary factor limiting the transmission rate in a smaller-size electronic circuit.

More specifically, signal transmission on the order of several hundreds of giga-hertz requires a conductor having an electric conductivity lower than that of copper which is currently used as a practical low-resistance material.

In addition, a signal transmission line having a width as small as 100 nm or less is not achieved by a current technology for the integrated circuit. This limits the degree of integration in the semiconductor integrated circuit.

SUMMARY OF THE INVENTION

It is an object of the present invention to provide a new signal transmission line capable of being fabricated to have a smaller width as small as 100 nm or less and having a transmission rate which is higher compared to that achieved by the current technology.

It is another object of the present invention to provide a method for signal transmission by using a magnetic signal transmission line.

The present invention provides a magnetic signal transmission line including a substrate having a main surface, and a plurality of single-magnetization domains arranged in a one-dimensional array on the main surface, each of the single-magnetization domains having a magnetization, whereby a signal is transferred along the one-dimensional array by a change of the magnetization.

The magnetic signal transmission line of the present invention is free from the problem encountered in the conventional signal transmission line wherein the signal transmission rate is limited by the CR constant, and has an advantage that the width of the signal transmission line can be made as small as 100 nm or less.

The above and other objects, features and advantages of the present invention will be more apparent from the following description, referring to the accompanying drawings.

PREFERRED EMBODIMENTS OF THE INVENTION

Figure 1:
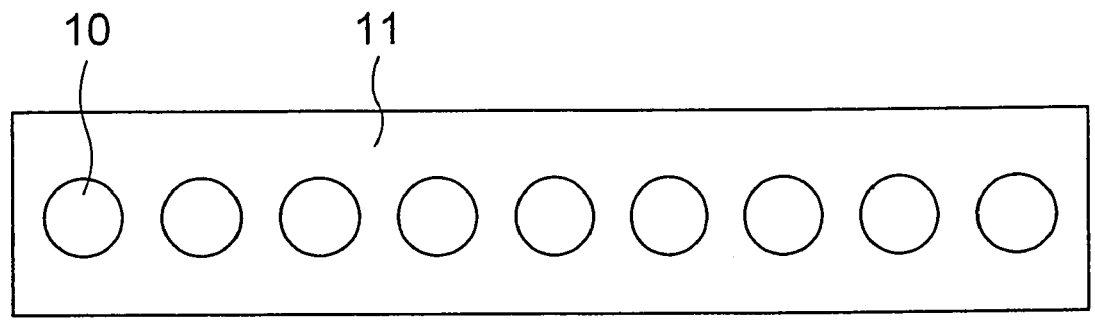
FIG. 1 is a partial top plan view of a magnetic signal transmission line according to a first embodiment of the present invention.

In the magnetic signal transmission line of the present invention, each single-magnetization domain (or magnetic domain) preferably has a spontaneous magnetization. A magnetic signal transmission line made of a ferromagnetic material has such spontaneous magnetization. A preferable distance between the adjacent single-magnetization domains is such that the interactive energy acting between magnetic dipoles in both the adjacent single-magnetization domains measured at a selected absolute temperature allows for operation of the magnetic signal transmission line at an operational ambient temperature. It is preferable that the direction of the easy axis of the single-magnetization domain reside in parallel with the main surface of the substrate, and in a direction along or perpendicular to the direction of the one-dimensional array of the single-magnetization domains.

It is also preferable that the dimension of each single-magnetization domain perpendicular to the substrate, i.e., the height be smaller than both the dimension along the one-dimensional array, i.e., length, and the dimension perpendicular to both the aforementioned dimensions, i.e., width of the single-magnetization domain. It is preferable that the width of the single-magnetization domain have a width equal to or larger than the length thereof.

In the description to follow, the length, width and height of the single-magnetization domains are defined by the dimension thereof along the direction of the array, the dimension thereof perpendicular to the length and parallel to the main surface of the substrate, and the dimension thereof perpendicular to the main surface, respectively.

Each single-magnetization domain may be separated from one another on the substrate with a space disposed between adjacent single-magnetization domains, or may be distributed as a part of a single continuous unit constituting the signal transmission line. It is preferable that the single-magnetization domains be periodically arranged.

The basic structure of the magnetic signal transmission line of the present invention includes a one-dimensional array of ferromagnetic bodies each having a minute structure formed on a non-magnetic substrate. The typical structure of the magnetic signal transmission line is as follows.

Each minute ferromagnetic body has width, length and height which are smaller than the thickness of the magnetic wall of a bulk of the ferromagnetic material used therefor so that each minute ferromagnetic body forms a single-magnetization domain and has a uniform spontaneous magnetization in the magnetic domain.

Each minute ferromagnetic body has a flat shape wherein the height is smaller than the length and the width, and has an easy plane for magnetization parallel to the substrate surface, whereby the spontaneous magnetization can be rotated within the easy plane.

The arrangement of the minute ferromagnetic bodies is such that the distance between adjacent ferromagnetic bodies is as small as possible and typically equivalent to the dimensions of the ferromagnetic body. The distance between adjacent single-magnetization domains is such that an interactive force acts between magnetic dipoles in the adjacent ferromagnetic bodies and that the interactive energy between the adjacent ferromagnetic bodies measured at a selected absolute temperature allows for operation of the magnetic signal transmission line at an operational ambient temperature, typically a room temperature.

Selection of different values between the width and the length of the minute ferromagnetic body provides an anisotropic energy wherein a difference occurs in the magnetic energy between a spontaneous magnetization aligned with the direction of the width of the single-magnetization domain and a spontaneous magnetization aligned with the direction of the length of the single-magnetization domain. The selection of dimensions is such that the width is equal to or significantly larger than the length so that the anisotropic energy of each single-magnetization domain resides between 0% to 120% of the interactive energy acting between magnetic dipoles in the adjacent minute ferromagnetic bodies.

The magnetization of minute magnetic body moves in co-operation with adjacent magnetic body when suitable values are selected for the interactive energy between magnetic dipoles and the anisotropic energy of the single-magnetization domain. Thus, the direction of the magnetization in the minute ferromagnetic bodies or the change thereof can be transferred along the one-dimensional array to achieve a signal transmission using the magnetic signal transmission line.

Now, the present invention is more specifically described with reference to accompanying drawings, wherein similar constituent elements are designated by similar or related reference numerals.

Figure 2:
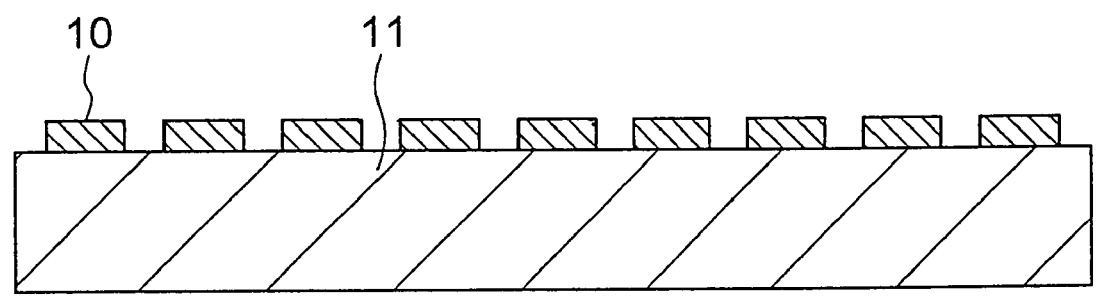
FIG. 2 is a longitudinal sectional view of the magnetic signal transmission line of FIG. 1.

Referring to FIGS. 1 and 2, a magnetic signal transmission line according to a first embodiment of the present invention includes a silicon substrate 11, and a one-dimensional array of magnetic dots 10 formed on the main surface of the silicon substrate. The array includes about 10,000 magnetic dots (minute ferromagnetic bodies) 10 in this embodiment. The magnetic dots 10 are made of iron and formed by the steps of forming a resist film on the silicon substrate, exposing the resist film for patterning using an electron beam exposure technique, sputtering iron onto the silicon substrate by using the resist film as a mask, and removing the resist film from the silicon substrate.

Each magnetic dot 10 is of a column shape having a diameter of 20 nm and a height of 10 nm. The distance between adjacent two of the magnetic dots 10 is 10 nm. Since the thickness of the magnetic wall of a bulk of iron is about 30 nm, the magnetic dot 10 having those dimensions, smaller than 30 nm, has a single-magnetization domain structure. The interactive energy acting between the magnetic dipoles in adjacent magnetic dots 10 is obtained from the distance between the magnetic dots 10, the dot dimensions and the saturation magnetization of iron, and is calculated at about 10,000K. This allows the magnetic dots 10 to operate at a room temperature. In this embodiment, the equality between the length and the width of the magnetic dot provides no in-plane anisotropy therein.

Figure 3:
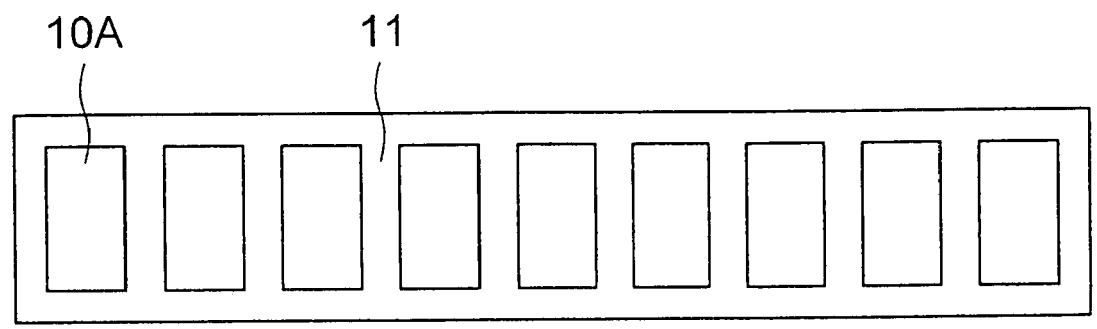
FIG. 3 is a partial top plan view of a magnetic signal transmission line according to a second embodiment of the present invention.
Figure 4:
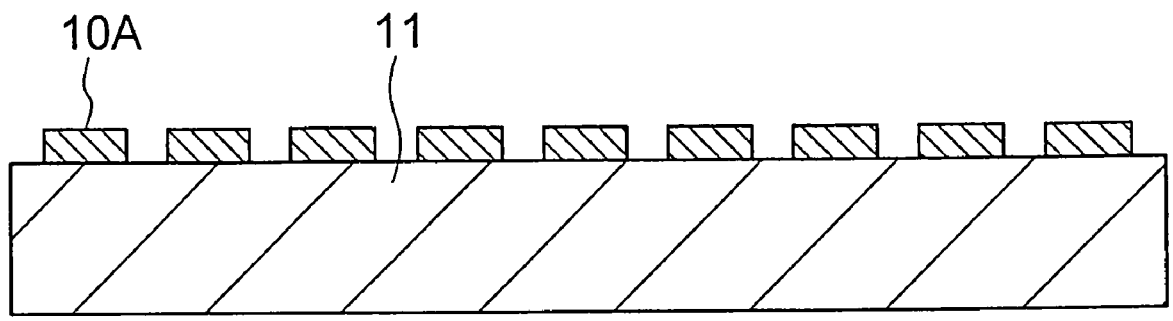
FIG. 4 is a longitudinal sectional view of the magnetic signal transmission line of FIG. 3.

Referring to FIGS. 3 and 4, a magnetic signal transmission line according to a second embodiment of the present invention is similar to the first embodiment except for the configuration of the magnetic dots 10A. Specifically, the one-dimensional array of magnetic dots 10 A is formed by etching an iron wire having a width of 30 nm. The army includes 10,000 magnetic dots 10 A having a length of 20 nm, a width of 30 nm and a height of 10 nm, whereby the magnetic dots 10 A are arranged with a pitch of 30 nm and a distance of 10 nm between adjacent magnetic dots 10 A. The interactive energy acting between the magnetic dipoles in the adjacent magnetic dots 20 is obtained by the distance between dots, dot dimensions and the saturation magnetization of iron, and calculated at 10,000K. The calculated interactive energy allows the magnetic dots to operate at a room temperature. The larger value for the width compared to the length as measured parallel to the substrate surface provides an in plane anisotropy, wherein the magnetization has an easy axis in the direction perpendicular to the direction of the array.

Figure 5:
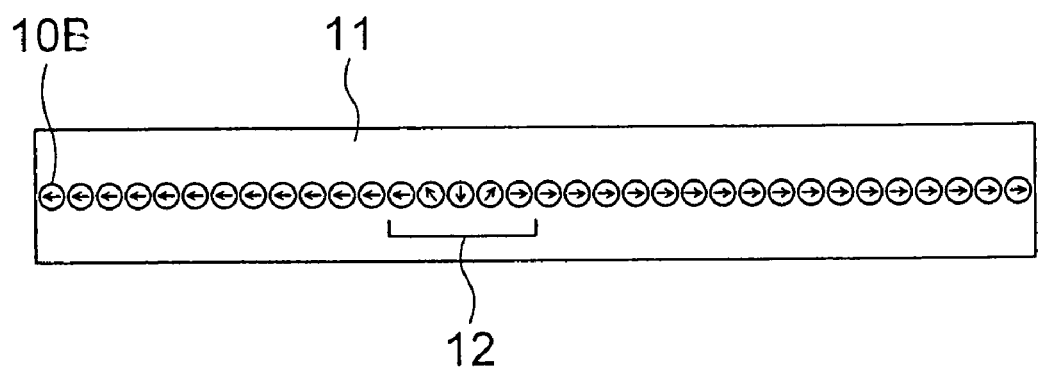
FIG. 5 is a partial top plan view of a magnetic signal transmission line according to a third embodiment of the present invention.
Figure 6:
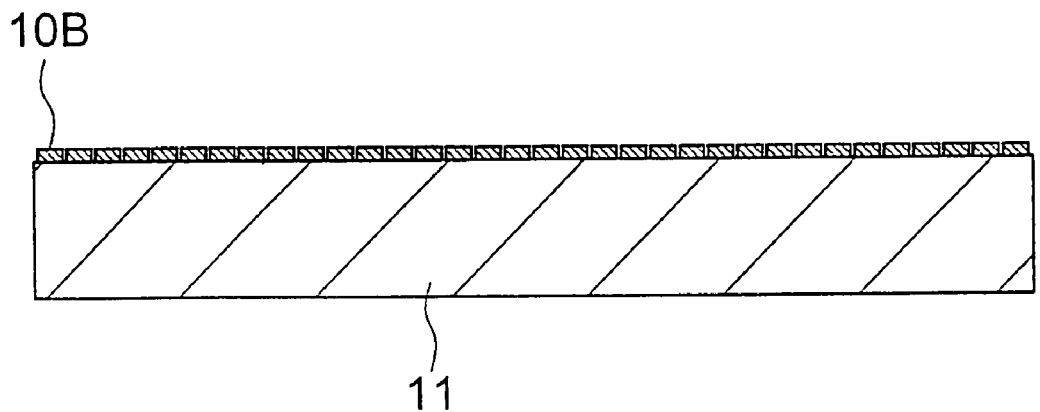
FIG. 6 is a longitudinal sectional view of the magnetic signal transmission line of FIG. 5.

Referring to FIGS. 5 and 6, a magnetic signal transmission line according to a third embodiment of the present invention is similar to the first embodiment except for the distance between the magnetic dots 10B. The distance is selected at 5 nm in the present embodiment, which allows the magnetic dots 10B to have an interactive energy measured at 20,000K between magnetic dipoles in the adjacent dots. In FIG. 5, the spontaneous magnetization of each magnetic dot 10B is depicted by an arrow, and is aligned with the direction of the array except for the location designated by numeral 12.

In the signal transmission line according to the present embodiment, the magnetic moment of each magnetic dot assumes a minimum due to the interactive energy when the magnetization is aligned with the direction of the array. If the magnetic signal transmission line is subjected to rotation of the magnetization of one or some of the magnetic dots, as shown at the location 12, the rotation of the magnetization can be transferred as a solitary wave at a high speed in the direction of the array. The transmission rate of the solitary wave can be calculated from the distance between the dots, the height of the dot and the saturation magnetization of iron. The calculated rate is 100 m/s in the third embodiment.

The transmission rate 100 m/s itself is not very large compared to the transmission rate in a conventional signal line. However, considering that the magnet signal line has a very small length due to its high-density-integration capability, and that a number of solitary waves can be transmitted at a transmission end in sequence without arrival thereof at a reception end, the calculated transmission rate 100 m/s is satisfactory. The solitary wave can be applied with a magnetic field by a magnetic head at the transmission end, and read from a magnetic field by another magnetic head at the reception end.

Figure 7:
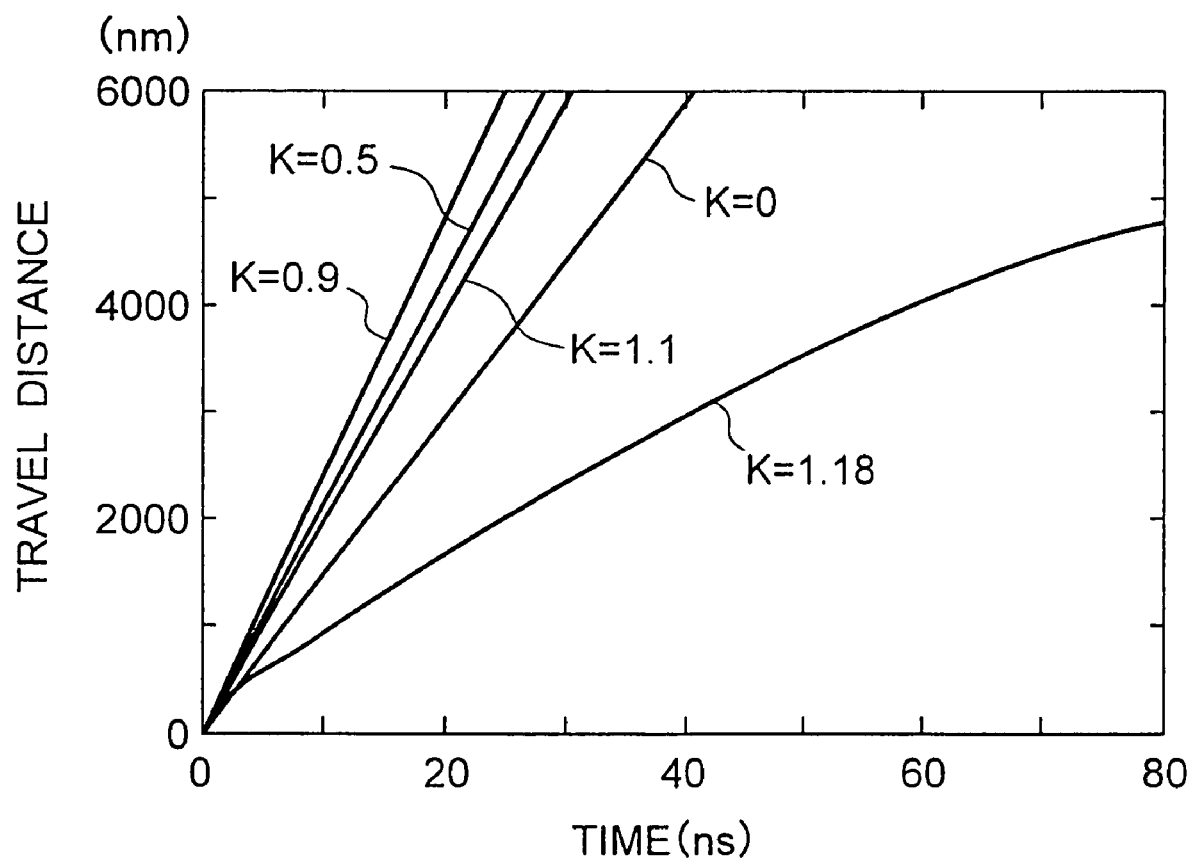
FIG. 7 is a graph for showing exemplified signal transmission characteristics of the magnetic signal transmission line, with a parameter being the ratio of the anisotropic energy to the interactive energy between magnetic dipoles.

Referring to FIG. 7, there is shown the signal transmission rate in the magnetic signal transmission line of the present invention. The signal transmission rate is shown by the travel distance of a solitary wave plotted with time (nano-second) and with a parameter of "K", which is the ratio of the anisotropic energy of the magnetic domain to the interactive energy acting between magnetic dipoles in the adjacent magnetic domains. The parameter "K" may be selected at a desired value by selecting the ratio of the major axis to the minor axis in a magnetic dot of an ellipse. For the parameter "K" which is between 0 and 1.2, the solitary wave can be transferred substantially at a constant rate due to the interactive energy acting between dipoles in adjacent single-magnetization domains.

Since the above embodiments are described only for examples, the present invention is not limited to the above embodiments and various modifications or alterations can be easily made therefrom by those skilled in the art without departing from the scope of the present invention. For example, in the above embodiment, the easy axis of the single-magnetization domain is aligned with the direction of the array. However, the easy axis may be perpendicular to the direction of the array in the present invention.

What is claimed is:

1. A magnetic signal transmission line comprising a substrate having a main surface, and a plurality of single-magnetization domains separated from one another and arranged in a one-dimensional array on said main surface, each of said single-magnetization domains having a magnetization, whereby a signal is transferred along said one-dimensional array by a change of said magnetization.

2. The magnetic signal transmission line as defined in claim 1, wherein said single-magnetization domain is formed in a magnetic material having a spontaneous magnetization.

3. The magnetic signal transmission line as defined in claim 2, wherein said magnetic material is a ferromagnetic substance.

4. The magnetic signal transmission line as defined in claim 1, wherein an interactive energy acting between dipoles in adjacent two of said single-magnetization domains in terms of absolute temperature is larger than an operational ambient temperature.

5. The magnetic signal transmission line as defined in claim 1, wherein each of said single-magnetization domains has an easy axis which is parallel to said main surface.

6. The magnetic signal transmission line as defined in claim 5 wherein said easy axis is parallel to a direction of said one-dimensional array.

7. The magnetic signal transmission line as defined in claim 5, wherein said easy axis is perpendicular to a direction of said one-dimensional array.

8. The magnetic signal transmission line as defined in claim 1, wherein each of said single-magnetization domains has a height smaller than both a width and a length thereof.

9. The magnetic signal transmission line as defined in claim 1, wherein each of said single-magnetization domains has a width equal to or larger than a length thereof.

10. The magnetic signal transmission line as defined in claim 1, wherein each of said single-magnetization domains is separated from an adjacent one of said single-magnetization domains with a space disposed therebetween.

11. The magnetic signal transmission line as defined in claim 1, wherein each of said single-magnetization domains is distributed as a part of a continuous unit of the magnetic signal transmission line.

12. The magnetic signal transmission line as defined in claim 1, wherein said single-magnetization domains are arranged periodically in said one-dimensional array.

13. The magnetic signal transmission line as defined in claim 1, wherein each of said single-magnetization domains has an anisotropic energy which resides between zero and 120% of interactive energy acting between dipoles in adjacent two of said single-magnetization domains.

14. A method for transmitting a signal by using a one dimensional array of a plurality of single-magnetization domains, said method comprising the steps of applying a magnetic field to at least one of the single-magnetization domains to cause a change of magnetization therein, and detecting a magnetization of another of said single-magnetization domains, wherein each of said single-magnetization domains are separated from one another.

15. The method as defined in claim 14, wherein said change of magnetization includes a change of direction of a spontaneous magnetization.

16. The method as defined in claim 14, wherein said change of magnetization is transferred as a solitary wave.

\* \* \* \* \*